United States Patent
Han et al.

(10) Patent No.: US 12,450,493 B2
(45) Date of Patent: Oct. 21, 2025

(54) DIMENSION REDUCTION IN THE CONTEXT OF UNSUPERVISED LEARNING

(71) Applicant: International Business Machines Corporation, Armonk, NY (US)

(72) Inventors: Si Er Han, Xi'an (CN); Jing Xu, Xi'an (CN); Xue Ying Zhang, Xi'an (CN); Ji Hui Yang, Beijing (CN); Xiao Ming Ma, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1248 days.

(21) Appl. No.: 17/209,302

(22) Filed: Mar. 23, 2021

(65) Prior Publication Data
US 2022/0309353 A1    Sep. 29, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 2019/0287030 A1 | 9/2019 | Varughese | |
| 2020/0372365 A1* | 11/2020 | Cecil | G06N 3/084 |
| 2021/0173825 A1* | 6/2021 | Lu | G06F 16/2365 |
| 2021/0216876 A1* | 7/2021 | McMenemy | G06F 30/27 |

OTHER PUBLICATIONS

Anonymous. "Cascade deep learning model training for visual analytics." IP.com Prior Art Database, Technical Disclosure No. IPCOM000245969D. 2016. 4 pages. (Year: 2016).*
Opochinsky et al. "K-Autoencoders Deep Clustering." Published in ICASSP 2020. pp. 4037-4041. (Year: 2020).*
Mukesh et al., "Clustering Enhanced Encoder-Decoder Approach to Dimensionality Reduction and Encryption", Evolution in Computational Intelligence, pp. 775-783, Conference Paper First Online: Sep. 9, 2020, Part of the Advances in Intelligent Systems and Computing book series (AISC, vol. 1176).

(Continued)

*Primary Examiner* — Brian M Smith
*Assistant Examiner* — Asher H. Jablon
(74) *Attorney, Agent, or Firm* — Rakesh Roy

(57) ABSTRACT

A method, a computer system, and a computer program product for receiving a plurality of unreduced training data records (TDRs), using a first autoencoder on the plurality of unreduced TDRs to obtain a first plurality of reduced TDRs, clustering the first plurality of reduced TDRs into a plurality of clusters, wherein each first reduced TDR cluster is assigned a respective cluster label, transferring the respective cluster label from each first reduced TDR cluster to a corresponding unreduced TDR cluster, and performing stratified sampling to form K data blocks of unreduced TDRs from a plurality of unreduced TDR clusters.

12 Claims, 11 Drawing Sheets

(56) References Cited

OTHER PUBLICATIONS

Mahmud et al., "Unsupervised classification of high-dimension and low-sample data with variational autoencoder based dimensionality reduction", 2019 IEEE 4th International Conference on Advanced Robotics and Mechatronics (ICARM), 6 pages.

Mukesh et al., "Clustering Enhanced Encoder-Decoder Approach to Dimensionality Reduction and Encryption", Abstract, Evolution in Computational Intelligence, pp. 775-783, Conference Paper First Online: Sep. 9, 2020, Part of the Advances in Intelligent Systems and Computing book series (AISC, vol. 1176).

Napoleon et al., "A New Method for Dimensionality Reduction using K-Means Clustering Algorithm for High Dimensional Data Set", International Journal of Computer Applications (0975-8887), vol. 13—No. 7, Jan. 2011, 6 pages.

Roman, Victor, "Unsupervised Learning: Dimensionality Reduction", Apr. 17, 2019, 13 pages, <https://towardsdatascience.com/unsupervised-learning-dimensionality-reduction-ddb4d55e0757>.

Wang et al., "A Folded Neural Network Autoencoder for Dimensionality Reduction", Proceedings of the International Neural Network Society Winter Conference (INNS-WC 2012), Procedia Computer Science 13 ( 2012 ) 120-127, SciVerse ScienceDirect.

Wang et al., "Auto-encoder based dimensionality reduction", Neurocomputing 184 (2016) 232-242, Available online Nov. 27, 2015, Elsevier, Contents lists available at Science Direct, http:/dx.doi.org/10.1016/j.neucom.2015.08.104.

Zamparo et al., "Deep Autoencoders for Dimensionality Reduction of High-Content Screening Data", arXiv:1501.01348v1 [cs.LG] Jan. 7, 2015, 5 pages.

\* cited by examiner

ORIGINAL DATA

| ID | X1 | X2 | ... | Xn |
|---|---|---|---|---|
| 1 | 0.3 | 0.7 | ... | 0.2 |
| 2 | 0.5 | 0.2 | ... | 0.6 |
| 3 | 0.4 | 0.3 |  | 0.5 |
| 4 | 0.2 | 0.6 |  | 0.7 |
| 5 | 0.8 | 0.4 |  | 0.6 |
| ... | ... | ... | ... | ... |
| N | 0.9 | 0.5 | ... | 0.7 |

FEATURE REPRESENTATIVE DATA SET                                     800

| ID | F1   | F2   | ... | Fm   |
|----|------|------|-----|------|
| 1  | 0.23 | 0.51 | ... | 0.36 |
| 2  | 0.31 | 0.52 | ... | 0.43 |
| 3  | 0.23 | 0.42 | ... | 0.38 |
| 4  | 0.25 | 0.47 | ... | 0.76 |
| 5  | 0.38 | 0.43 | ... | 0.81 |
| ... | ... | ...  | ... | ...  |
| N  | 0.42 | 0.93 | ... | 0.75 |

FIG. 8

CLUSTER RESULTS                                                     900

| ID | F1   | F2   | ... | Fm   | CLUSTER LABEL |
|----|------|------|-----|------|---------------|
| 1  | 0.23 | 0.51 | ... | 0.36 | CLUSTER-1     |
| 2  | 0.31 | 0.52 | ... | 0.43 | CLUSTER-1     |
| 3  | 0.23 | 0.42 | ... | 0.38 | CLUSTER-2     |
| 4  | 0.25 | 0.47 | ... | 0.76 | CLUSTER-2     |
| 5  | 0.38 | 0.43 | ... | 0.81 | CLUSTER-2     |
| ... | ... | ...  | ... | ...  | ...           |
| N  | 0.42 | 0.93 | ... | 0.75 | CLUSTER-1     |

FIG. 9

ORIGINAL DATA ~1002

| ID | X1 | X2 | ... | Xn | CLUSTER LABEL |
|----|-----|-----|-----|-----|---------------|
| 1 | 0.3 | 0.7 | ... | 0.2 | CLUSTER-1 |
| 2 | 0.5 | 0.2 | ... | 0.6 | CLUSTER-1 |
| 3 | 0.4 | 0.3 | ... | 0.5 | CLUSTER-2 |
| 4 | 0.2 | 0.6 | ... | 0.7 | CLUSTER-2 |
| 5 | 0.8 | 0.4 | ... | 0.6 | CLUSTER-2 |
| ... | ... | ... | ... | ... | |
| N | 0.9 | 0.5 | ... | 0.7 | CLUSTER-1 |

DATA SAMPLE 1 ~1004

| ID | X1 | X2 | ... | Xn |
|----|-----|-----|-----|-----|
| 1 | 0.3 | 0.7 | ... | 0.2 |
| 4 | 0.2 | 0.6 | ... | 0.7 |
| ... | ... | ... | ... | ... |

DATA SAMPLE 2 ~1006

| ID | X1 | X2 | ... | Xn |
|----|-----|-----|-----|-----|
| 3 | 0.4 | 0.3 | ... | 0.5 |
| 4 | 0.2 | 0.6 | ... | 0.7 |
| ... | ... | ... | ... | ... |

DATA SAMPLE K ~1008

| ID | X1 | X2 | ... | Xn |
|----|-----|-----|-----|-----|
| 2 | 0.5 | 0.2 | ... | 0.6 |
| 5 | 0.8 | 0.4 | ... | 0.6 |
| ... | ... | ... | ... | ... |

FIG. 10

DIMENSION REDUCTION IN THE CONTEXT OF UNSUPERVISED LEARNING

BACKGROUND

The present invention relates generally to the field of machine learning, and more particularly to reduction in the number of dimensions in the context of unsupervised learning.

A preliminary note on terminology: the words "dimension" and "dimension" are herein used synonymously and interchangeably. "Dimension value" is the term that will be used to signify the value that a dimension has in a given case or instance. For example, one familiar dimension is eye color—"blue" is the dimension value for John Doe with respect to this dimension. The term "parameter" is herein considered a synonymous and interchangeable with "dimension." While the word "parameter" may have special meanings in the context of the field of machine learning technology, but those special meanings are not applicable in this document except as may be affirmatively indicated in the text. A "vector" is a set of multiple dimension values respectively corresponding to a set of dimensions that relate to a single thing. For example, if a vehicle is determined to be travelling due north at 30 knots, then the velocity of the vehicle is a vector with two constituent dimension values: (i) "due north" for the directional dimension; and (ii) "30 knots" for the absolute speed dimension of velocity.

The Wikipedia entry for "dimension reduction" (as of Jan. 4, 2021) states as follows: "Dimensionality reduction, or dimension reduction, is the transformation of data from a high-dimensional space into a low-dimensional space so that the low-dimensional representation retains some meaningful properties of the original data, ideally close to its intrinsic dimension. Working in high-dimensional spaces can be undesirable for many reasons; raw data are often sparse as a consequence of the curse of dimensionality, and analyzing the data is usually computationally intractable. Dimensionality reduction is common in fields that deal with large numbers of observations and/or large numbers of variables, such as signal processing, speech recognition, neuroinformatics, and bioinformatics. Methods are commonly divided into linear and non-linear approaches. Approaches can also be divided into feature selection and feature extraction. Dimensionality reduction can be used for noise reduction, data visualization, cluster analysis, or as an intermediate step to facilitate other analyses." (footnote(s) omitted)

The Wikipedia entry for "unsupervised learning" (as of Jan. 4, 2021) states as follows: "Unsupervised learning is a type of machine learning that looks for previously undetected patterns in a data set with no pre-existing labels and with a minimum of human supervision. In contrast to supervised learning that usually makes use of human-labeled data, unsupervised learning, also known as self-organization allows for modeling of probability densities over inputs. It forms one of the three main categories of machine learning, along with supervised and reinforcement learning. Semi-supervised learning, a related variant, makes use of supervised and unsupervised techniques. Two of the main methods used in unsupervised learning are principal component and cluster analysis. Cluster analysis is used in unsupervised learning to group, or segment, data sets with shared attributes in order to extrapolate algorithmic relationships. Cluster analysis is a branch of machine learning that groups the data that has not been labelled, classified, or categorized. Instead of responding to feedback, cluster analysis identifies commonalities in the data and reacts based on the presence or absence of such commonalities in each new piece of data. This approach helps detect anomalous data points that do not fit into either group." (footnote(s) omitted)

The Wikipedia entry for "Stratification (clinical trials)" (as of 19 Feb. 2021) states as follows: "Stratification of clinical trials is the partitioning of subjects and results by a factor other than the treatment given. Stratification can be used to ensure equal allocation of subgroups of participants to each experimental condition. This may be done by gender, age, or other demographic factors. Stratification can be used to control for confounding variables (variables other than those the researcher is studying), thereby making it easier for the research to detect and interpret relationships between variables. For example, if doing a study of fitness where age or gender was expected to influence the outcomes, participants could be stratified into groups by the confounding variable. A limitation of this method is that it requires knowledge of what variables need to be controlled. Types of stratification[.] Stratified random sampling designs divide the population into homogeneous strata, and an appropriate number of participants are chosen at random from each stratum. Proportionate stratified sampling involves selecting participants from each stratum in proportions that match the general population. This method can be used to improve the sample's representation of the population, by ensuring that characteristics (and their proportions) of the study sample reflect the characteristics of the population. Alternatively, disproportionate sampling can be used when the strata being compared differ greatly in size, as this allows for minorities to be sufficiently represented."

The Wikipedia entry for "Cluster analysis" (as of 19 Feb. 2021) states as follows: "Cluster analysis or clustering is the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning. Cluster analysis itself is not one specific algorithm, but the general task to be solved. It can be achieved by various algorithms that differ significantly in their understanding of what constitutes a cluster and how to efficiently find them. Popular notions of clusters include groups with small distances between cluster members, dense areas of the data space, intervals, or particular statistical distributions. Clustering can therefore be formulated as a multi-objective optimization problem. The appropriate clustering algorithm and dimension settings (including dimensions such as the distance function to use, a density threshold or the number of expected clusters) depend on the individual data set and intended use of the results. Cluster analysis as such is not an automatic task, but an iterative process of knowledge discovery or interactive multi-objective optimization that involves trial and failure. It is often necessary to modify data preprocessing and model dimensions until the result achieves the desired properties . . . . The notion of a 'cluster' cannot be precisely defined, which is one of the reasons why there are so many clustering algorithms. There is a common denominator: a group of data objects. However, different researchers employ different cluster models, and for each of these cluster models again different algorithms can be given. The notion of a cluster, as found by different algorithms, varies significantly in its properties. Understanding these 'cluster models' is key to understanding the differences between the various algorithms. Typical cluster models include: . . . Connectivity models . . . Centroid models . . . Distribution models . . . Density models . . . Subspace models . . . Group models . . . Graph-based models . . . Signed graph models . . . Neural models[.]"

SUMMARY

According to an aspect of the present invention, there is a method, computer program product and/or system that performs the following operations (not necessarily in the following order): (i) receiving an unreduced training data in the form of a plurality of TDRs (training data sets), with each TDR including at least M dimension values and with each dimension value respectively corresponding to one of M dimensions characterizing the unreduced training data; (ii) using a first autoencoder on the plurality of TDRs to obtain first reduced training data in the form of a plurality of TDRs, with each TDR including at least N dimension values, with each dimension value respectively corresponding to one of N dimensions characterizing the first reduced training data, and with N being less than M; (iii) clustering, into a plurality of clusters, the plurality of TDRs of the first reduced training data so that each TDR belongs to a cluster of the plurality of clusters; (iv) assigning a cluster identification code to each cluster of the plurality of clusters; (v) adding cluster identification codes to each TDR of the plurality of TDRs of the unreduced training data based on the clusters to which the respective TDRs belong; and (vi) perform stratified sampling to form K data blocks from the TDRs of the unreduced data, using the cluster identification codes as a stratified variable.

BRIEF DESCRIPTION OF THE DRAWINGS

FIG. 8 is a data table according to an embodiment of the present invention;

FIG. 9 is a data table according to an embodiment of the present invention;

FIG. 10 is a diagram according to an embodiment of the present invention;

DETAILED DESCRIPTION

Figure 1:
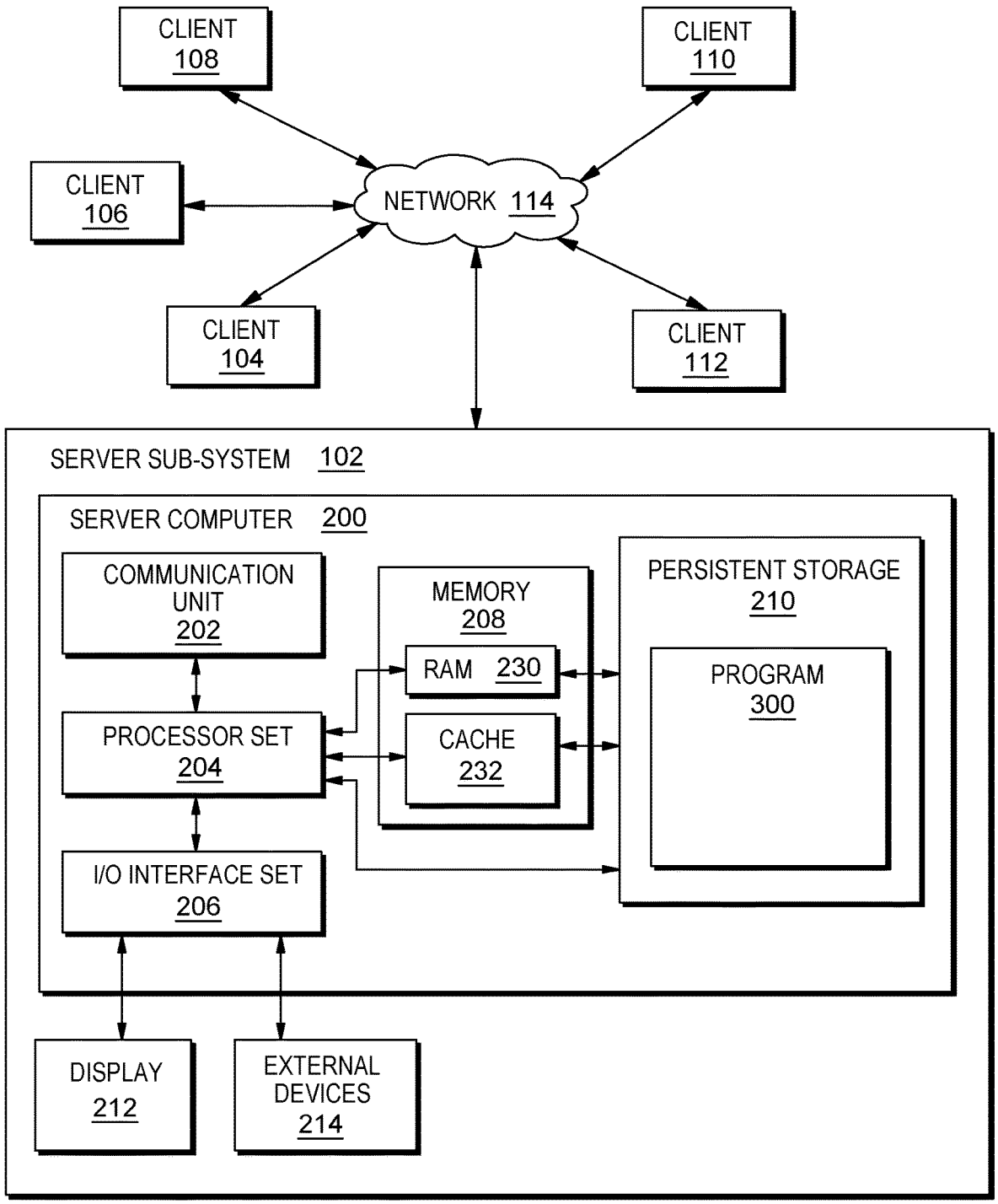
FIG. 1 is a block diagram view of a first embodiment of a system according to the present invention.

Some embodiments of the present invention reduce an amount of data that is relevant to a problem or question by: (i) performing dimension reduction on the original unreduced data to reduce the data; (ii) by clustering the reduced data and performing stratified sampling on the cluster, using stratification codes assigned on a cluster by cluster basis; and (iii) performing dimension reduction on the stratified samples; (iv) aggregating the dimension reduction models into a final dimension reduction model; and (v) using the final model to reduce the original training data.

Some embodiments of the present invention may include one, or more, of the following operations, features, characteristics and/or advantages: (i) combines clustering, stratified sampling, and autoencoder methods to reduce dimensions; (ii) builds an autoencoder on the entire data set to extract a smaller number of dimensions of the original data; (iii) performs clustering of data records based on reduced dimensions of Element B and append the cluster ID (identification) into the original data; (iv) uses the cluster ID as a stratified variable to perform stratified sampling to form K data blocks; (v) builds an autoencoder model in each block; (vi) aggregates the autoencoder models from each data block to a final autoencoder model (one example of model aggregation uses the average of the weights of the corresponding nodes in different autoencoder networks as the final weight of the corresponding nodes in the final autoencoder network); and/or (vii) extracts the reduced dimensions using the final autoencoder.

This Detailed Description section is divided into the following subsections: (i) The Hardware and Software Environment; (ii) Problem/Solution Format Explanation; (iii) Example Embodiment; (iv) Further Comments and/or Embodiments; and (v) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage, and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Problem/Solution Format Explanation

PROBLEM. Some embodiments of the present invention recognize the following facts, potential problems and/or potential areas for improvement with respect to the current state of the art: (i) in machine learning, there may be hundreds of thousands of dimensions in the data and building a predictive model, because of the number of dimensions, can lead to running out of computer memory; (ii) if the computer memory runs out, dimension reduction techniques can be used to transform the data from high-dimensional space into a low-dimensional space so that the low-dimensional representation retains some meaningful properties of the original data; (iii) there are many traditional methods to solve the above stated problems (for example, PCA (principal component analysis), autoencoder, dbscan, etc.) but when the data has anomalies, these methods cannot give robust results; and/or (iv) this can result in inaccurate analysis in the subsequent steps of the machine learning process.

SOLUTION. The solution is a computer implemented method that includes the use of clustering, stratified sampling and autoencoder methods to reduce dimensions. This computer implemented method solves one or more of the above noted problems by performing one, or more, of the following steps: (i) Step 1: build an autoencoder on the entire data set to extract a smaller number of dimensions of the original data; (ii) Step 2: cluster data records based on reduced dimensions of step 1 above, and append the cluster ID (identification) into the original data; (iii) Step 3: Using the cluster ID as a stratified variable, perform stratified sampling to form K data blocks; (iv) Step 4: build an autoencoder model in each block; (v) Step 5: aggregate the autoencoder models from each data block to obtain a final autoencoder model (for example, one type of model aggregation is using the average of the weights between two nodes as the final weight of two corresponding nodes in the final autoencoder); and (vi) Step 6: extract the reduced dimensions using the final autoencoder.

III. Example Embodiment

Figure 2:
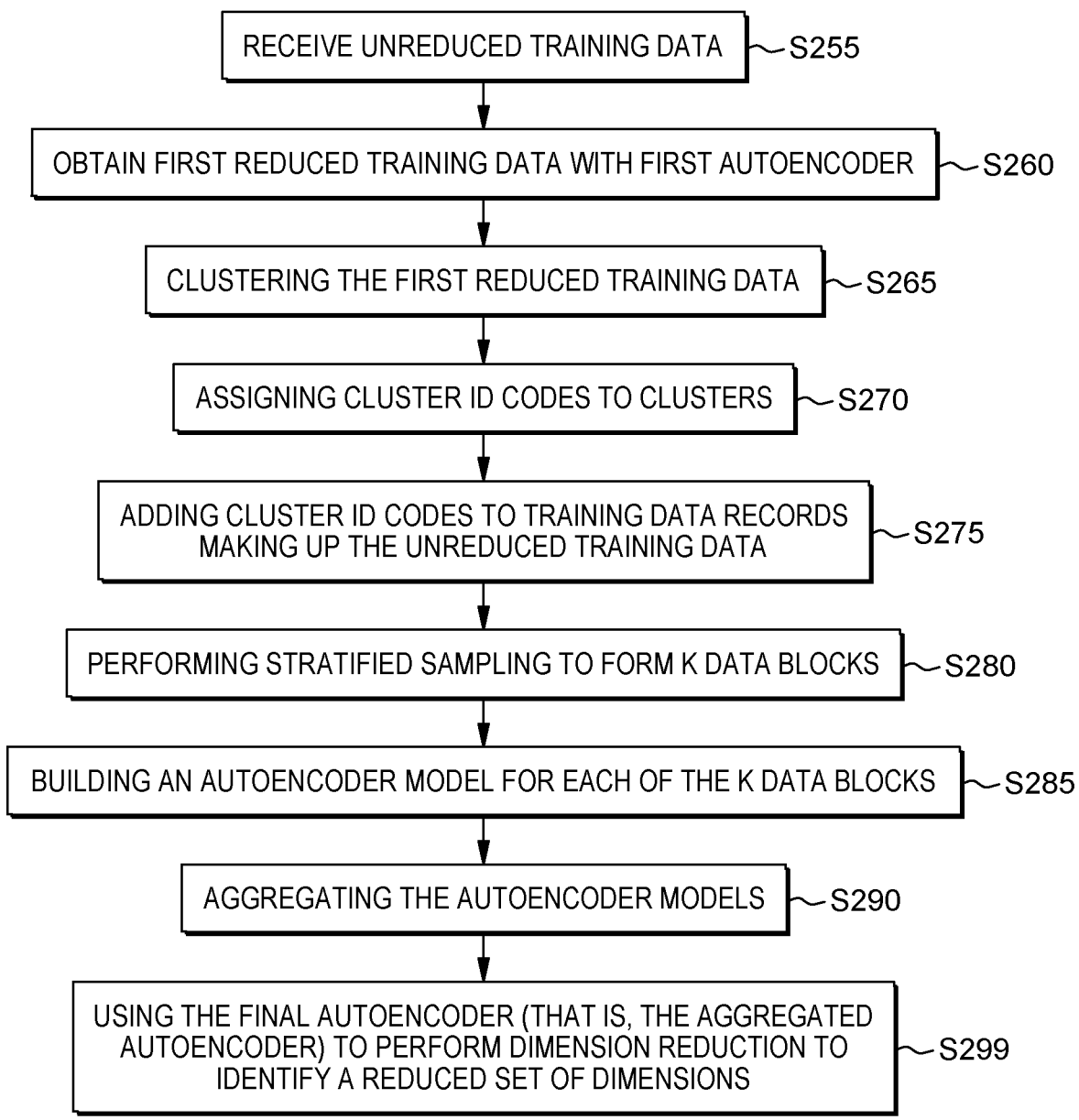
FIG. 2 is a flowchart showing a first embodiment method performed, at least in part, by the first embodiment system.
Figure 3:
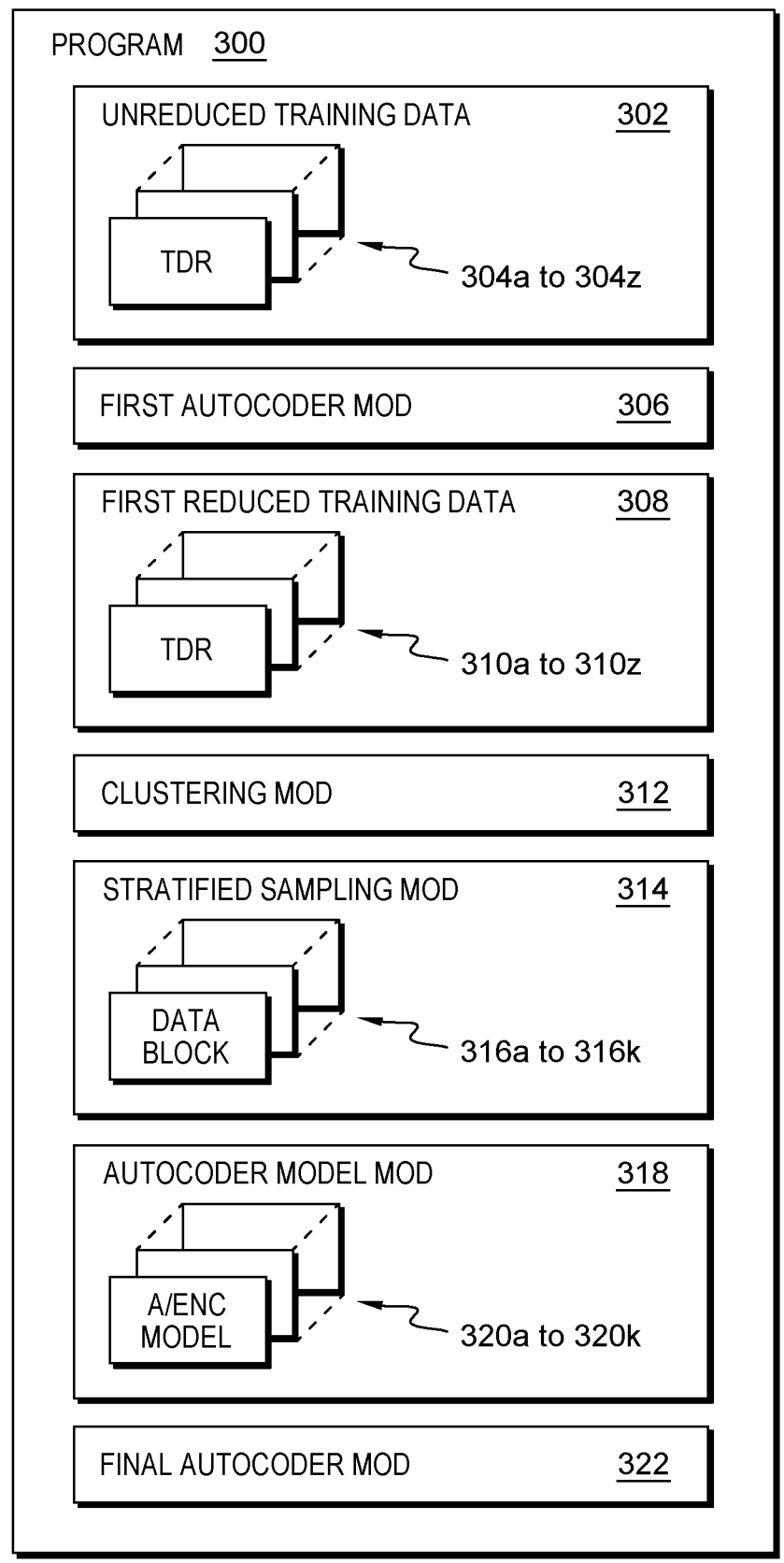
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4A:
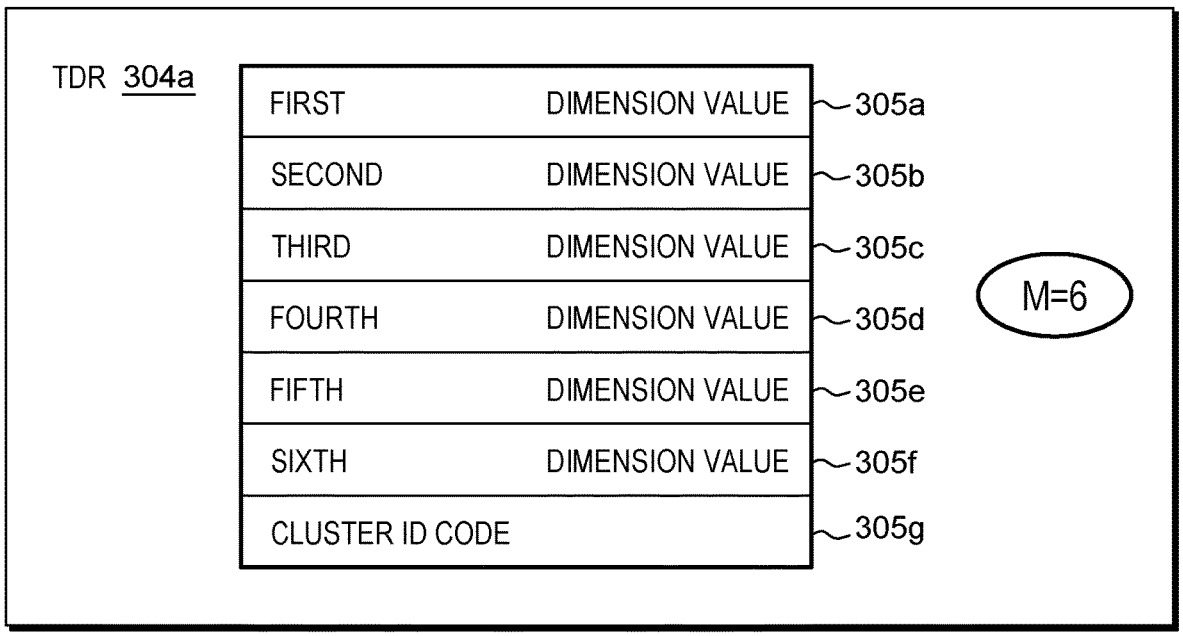
FIGS. 4A, 4B, and 4C are data diagrams generated by the first embodiment system.

Processing begins at operation S255, where unreduced training data 302 is received in the form of multiple TDRs (training data records) 304a to 304z, with each TDR including at least M dimension values and with each dimension value respectively corresponding to one of M dimensions characterizing the unreduced training data. As shown in FIG. 4A, the unreduced training data has six dimensions in this example, meaning that M=6. More specifically, representative unreduced TDR 304 includes six dimension values 305 a,b,c,d,e, and f respectively corresponding to the six (6) dimensions of the unreduced data.

Figure 4B:
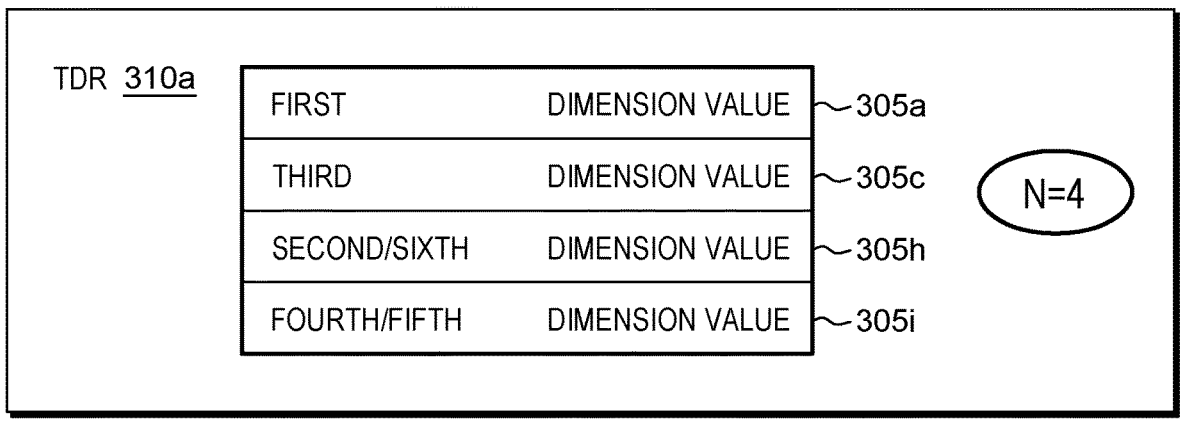

Processing proceeds to operation S260, where first autoencoder mod 306 autoencodes the unreduced training data to obtain first reduced training data 308 in the form of multiple TDRs 310a to 310z. In this particular example, the number of dimensions in the first reduced training data is reduced from M=6 down to N=4 by this operation S260. As shown in FIG. 4B, representative TDR 310a of the first reduced training data is characterized by four (4) dimensions corresponding to four dimension values 305a, 305c, 305h and 305i, meaning that N=4 for the TDRs making up the first reduced training data. Dimension values 305a and 305c are obtained directly from the unreduced data. The way in which values 305h and 305i were obtained will be discussed in the next paragraph.

COMBINATION OF DIMENSIONS: More specifically, the reduction in this example occurs because three of the dimensions of the unreduced data set have been combined into combined values that are obtained by a function of two or more dimension values. For example, value 305h is obtained by a mathematical function of second dimension value 305b and sixth dimension value 305f. For this reason, value 305h is herein more particularly called second/sixth dimension value 305h. Similarly, dimension value 305i is also called fourth/fifth dimension value 305i, and reflects a mathematical combination of the fourth dimension value 305d from the unreduced data and the fifth dimension value 305e from the unreduced data. While some embodiments of the present invention may always combine dimension values to reduce data, it is possible that some embodiments might jettison values from certain dimensions altogether to achieve dimension reduction, in whole or in part.

Processing proceeds to operation S265, where clustering mod 312 clusters first reduced training data 308 into a set of clusters, so that each TDR 310a to 310z belongs to a cluster. In this embodiment, the type of clustering model (see Background section) is distribution model, but other types of clustering model (for example, centroid model) can be used.

Processing proceeds to operation S270, where mod 312 assigns a cluster identification code to each cluster previously defined at operation S265. In this example, the cluster id's take the form of 8 bit codes (that is, cluster 000 to cluster 255 in base ten numerical terms). This does mean that every cluster must be used or that every cluster must include some of the TDR's (keep in mind that there are only 26 TDRs, 310a to 310z in this relatively simple example).

Processing proceeds to operation S275, where mod 312 adds cluster identification codes to each TDR 304a to 304z of unreduced training data 302 based on the clusters to which the respective TDRs belong. As shown in FIG. 4A, the cluster ID code for TDR 304a is added to the TDR as reference numeral 305g.

Processing proceeds to operation S280, stratified sampling mod 314 performs stratified sampling to form K data blocks 316a to 316k from the TDRs 304a to 304z of the unreduced data, using the cluster identification codes (for example, cluster ID code 305g of TDR 304a) as a stratified variable.

Processing proceeds to operation S285, where autoencoder model mod 318 builds an autoencoder model respectively corresponding to each data block of the K data blocks 320a to 320k.

Processing proceeds to operation S290, where final autoencoder mod 322 aggregates the autoencoder models previously built at operation S285 to obtain a final autoencoder (not separately shown in FIG. 3).

Processing proceeds to operation S299, where mod 322 uses the final autoencoder on TDRs 304a to 304z to obtain an identification of a set of L dimensions from among the M dimensions characterizing unreduced training data 302. L will be less than M. L will also be less than N. In this example, L=3, meaning that the final autoencoder reduced the dimensions from M=6 down to L=3 in this example.

Figure 4C:
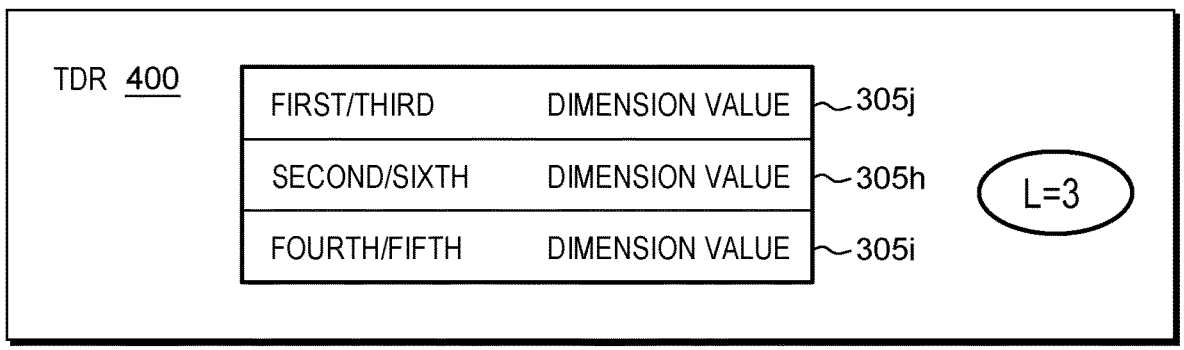

As shown in FIG. 4C, final reduced training data (such as representative TDR 400 corresponding to original TDR 304a) is created by combining dimension values and/or using combined dimension values that were previously generated in the method of flowchart 250. More specifically, TDR 400 has only L=3 dimension values as follows: first/third dimension value 305j, second/sixth dimension value 305h and fourth/fifth dimension value 305i. This reduction all the way down to three (3) dimensions can make training more computationally efficient, without reducing effectiveness and/or robustness of the training too much. These TDR's (for example, TDR 400), as reduced by the final encoder, are used in performing training in a machine learning computer system.

IV. Further Comments and/or Embodiments

Some embodiments of the present invention recognize the following facts, potential problems and/or potential areas for improvement with respect to the current state of the art: (i) in machine learning, we often need to learn a model which can effectively describe the relationship between dimensions and a target (the variable that needs to predict); (ii) problems arise if there are hundreds of thousands of dimensions; (iii) sometimes, a model cannot be obtained because of the number of dimensions, which can lead to running out of computer memory; (iv) there are many existing methods to solve the problems described above (for example, PCA, autoencoder, dbscan (density-based spatial clustering of applications with noise), and so on); and/or (v) when the data is large in both width and depth, the methods described above are not efficient.

Some embodiments of the present invention may include one, or more, of the following operations, features, characteristics and/or advantages: (i) combines clustering, stratified sampling, and autoencoder methods to reduce dimensions; (ii) uses an autoencoder method to reduce dimensions; (ii) clusters data based on a reduced number of dimensions (that is, using less than all the variables for which input data dimension values are available): (iii) uses a stratified sampling method many times to draw data randomly; (iv) based on the sampled data, builds several autoencoder models on the sampled data; (v) the autoencoder models are aggregated; (vi) high dimensional data is reduced using the aggregated autoencoder models; (vii) uses a clustering method to reduce the variation of data; (viii) the results of clustering are used as sampling data; (ix) based on each sample, an autoencoder model is built; (x) the original dimensions of the data are reduced by the aggregation of autoencoder models from each sample; and/or (xi) reduces dimensions so that the dimension reduction results can be robust when there are anomalies in the data.

Some embodiments of the present invention may include one, or more, of the following operations, features, characteristics and/or advantages: (i) includes a design dimension reduction method in parallel computing; (ii) combines cluster and autoencoder methods to reduce dimensions as shown in the following steps: (a) Step 1: group data records into sub-data blocks using a clustering method, (b) Step 2: in each cluster, use an autoencoder method to extract the top K dimensions, (c) Step 3: combine the reduced dimensions from all cluster together, and (d) Step 4: repeat Steps 1-3 above until the clusters convergence.

One embodiment of the present invention uses interchangeably (that is, using an autoencoder and cluster to reduce the dimensions, while at the same time avoiding the affection of anomalies) plus machine learning to perform dimension reduction when there are anomalies in records.

Some embodiments of the present invention recognize the following facts, potential problems and/or potential areas for improvement with respect to the current state of the art: (i) dimension reduction is an important step; (ii) it will be a problem if there are hundreds of thousands of dimensions; and/or (iii) sometimes a model cannot be obtained because of the number of dimension, which can lead to an out of memory condition.

Some embodiments of the present invention may include one, or more, of the following operations, features, characteristics and/or advantages with respect to the advantages of dimension reduction: (i) training speed is improved; (ii) since the model has fewer degrees of freedom, the likelihood of overfitting is lower; (iii) the model will generalize more easily to new data; and/or (iv) by using feature selection, the reduction will promote the important variables.

Some embodiments of the present invention recognize the following facts, potential problems and/or potential areas for improvement with respect to the current state of the art: (i) there are many traditional methods to solve the problem of dimension reduction (for example, PCA, autoencoder, dbscan, etc.), however, when the data have anomalies, these methods are not satisfying; and/or (ii) what is needed is to design a dimension reduction method that works well when the data have anomalies.

In one embodiment of the present invention, a method is used that combines clustering, stratified sampling, and autoencoder methods to reduce dimensions and consists of the following operations: (i) applies autoencoder on entire data set to extract top dimensions; (ii) clusters data records based on top dimensions where cluster ID is later employed for stratified sampling; (iii) performs stratified sampling to form data blocks, and in each block, uses autoencoder methods to extract top K dimensions; and (iv) aggregates the results for a stable final output.

Figure 5:
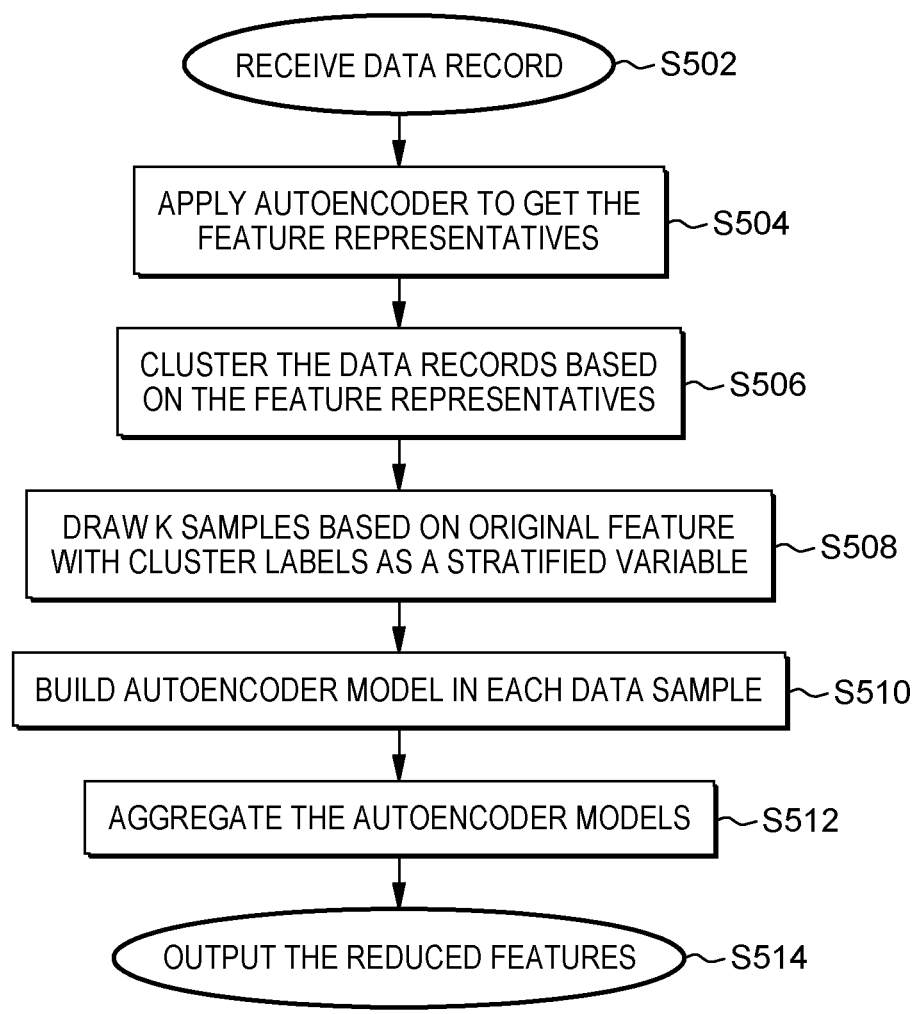
FIG. 5 is a flowchart showing a second embodiment method.
Figures 6, 7:
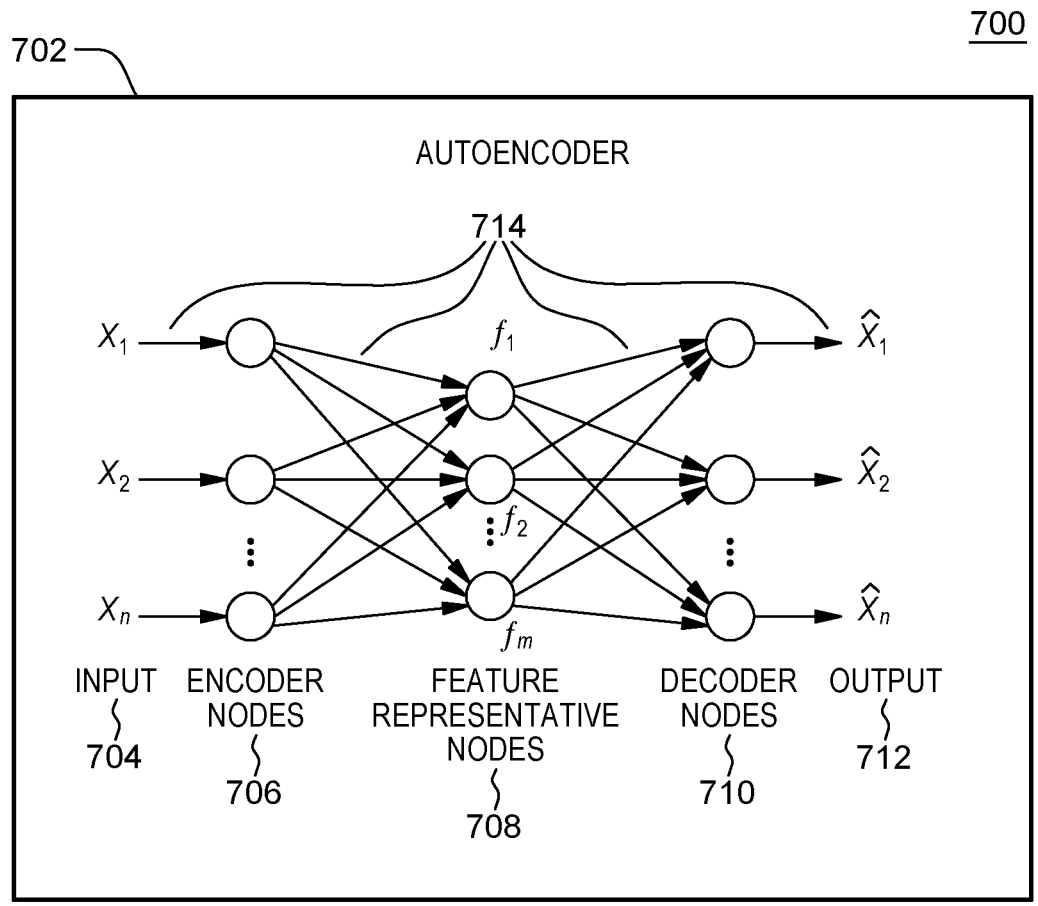
FIG. 6 is a data table according to an embodiment of the present invention.
FIG. 7 is a diagram according to an embodiment of the present invention.
Figure 11:
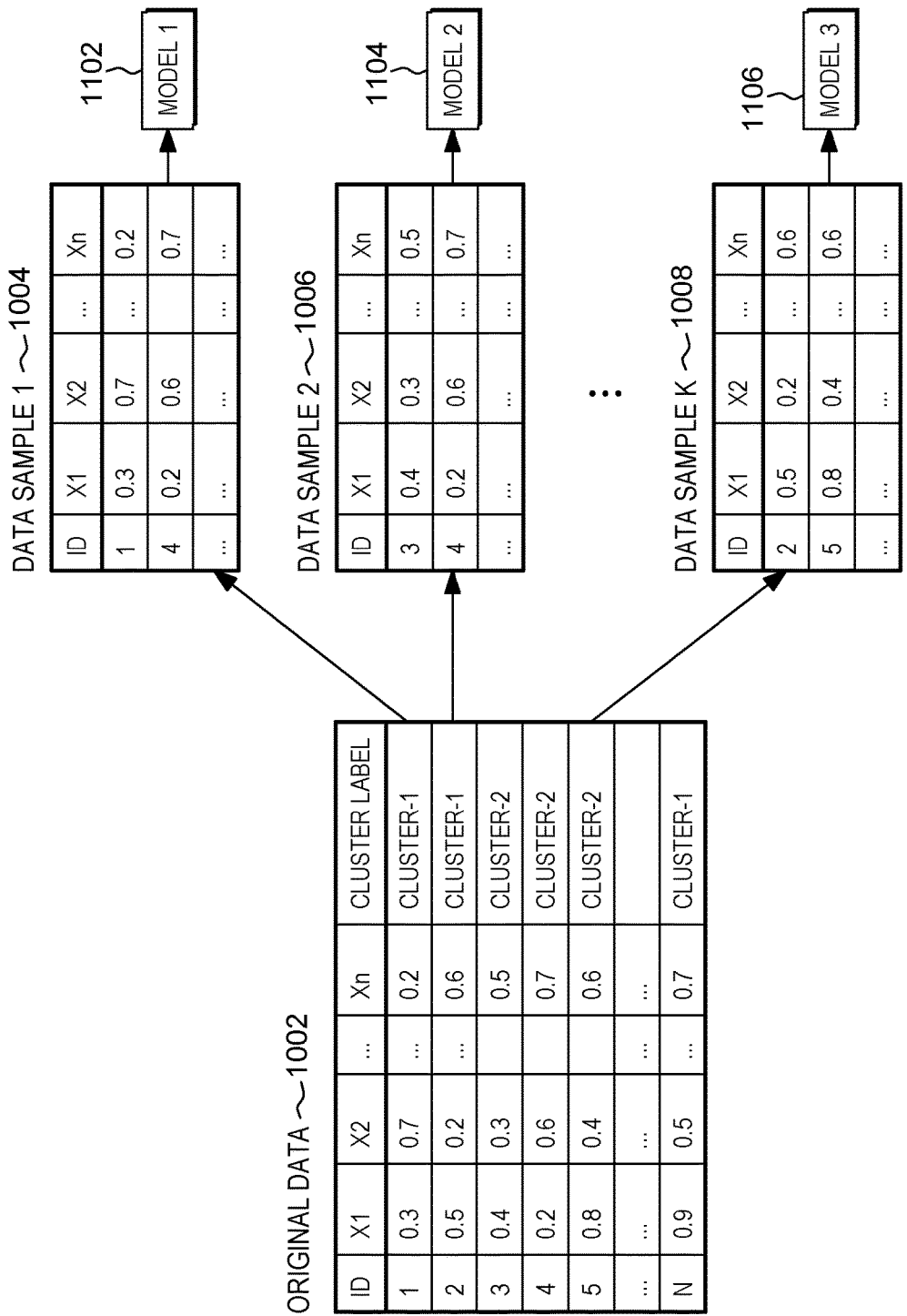
FIG. 11 is a diagram according to an embodiment of the present invention.
Figure 12:
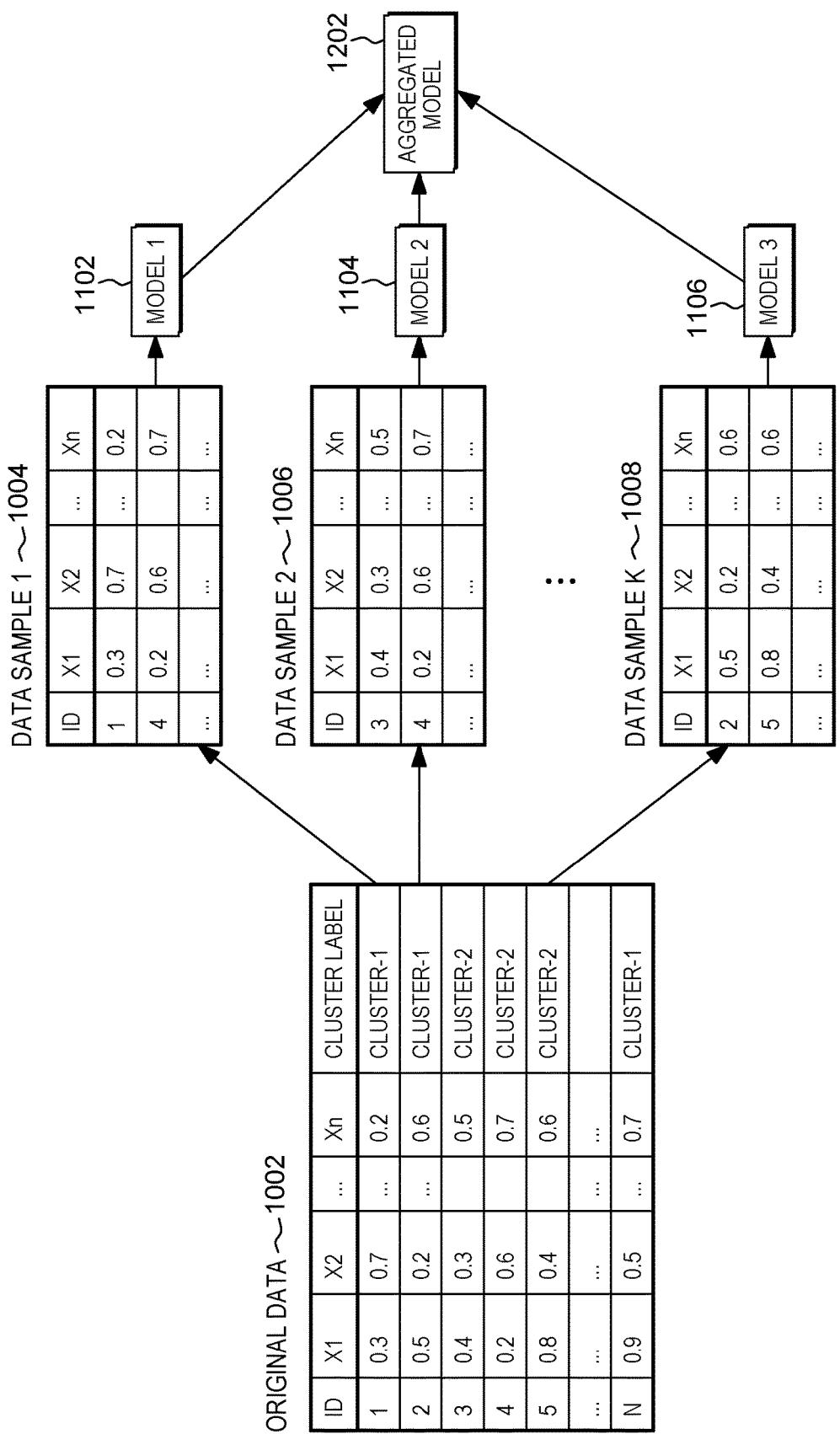
FIG. 12 is a diagram according to an embodiment of the present invention.
Figure 13:
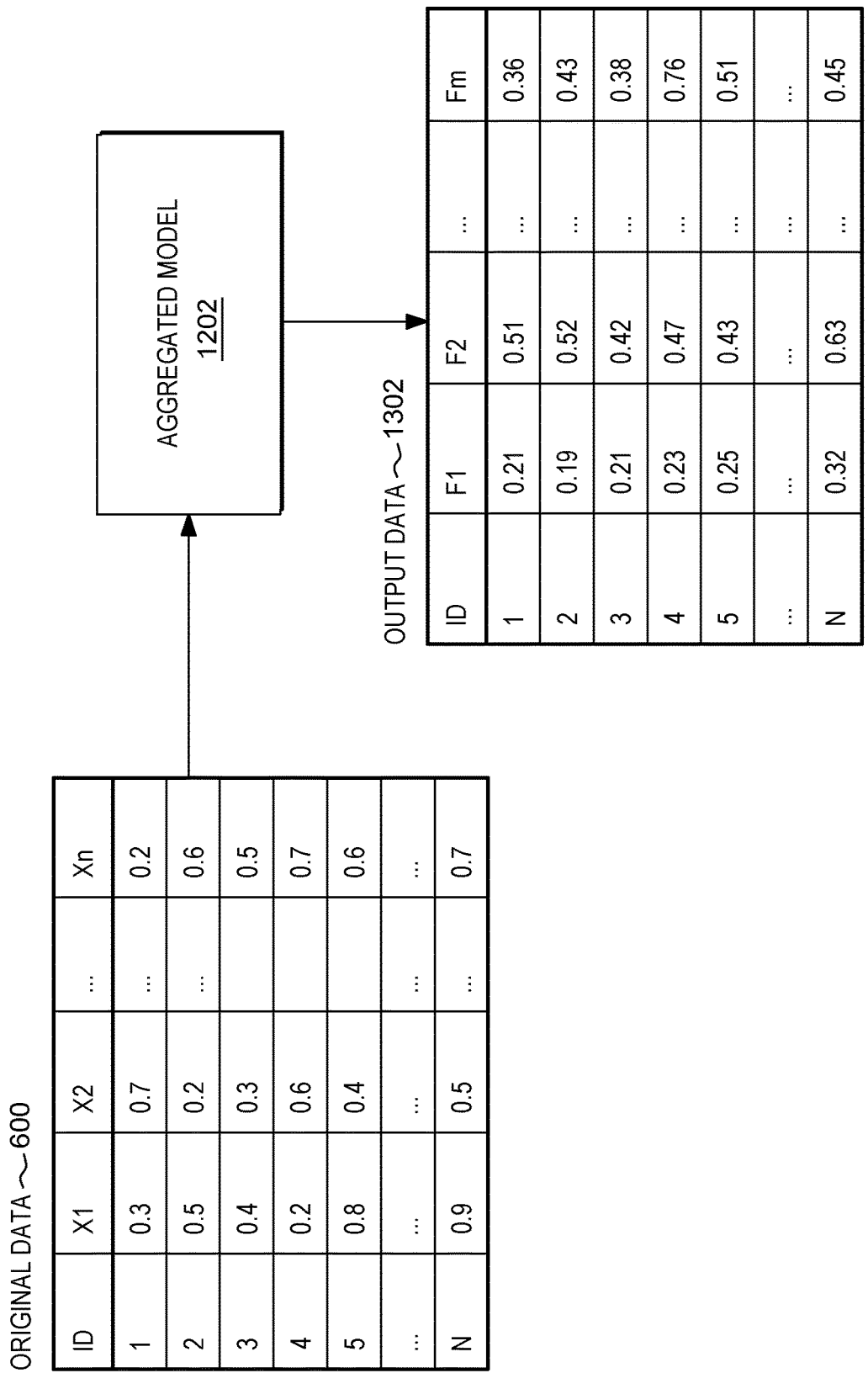
FIG. 13 is a diagram according to an embodiment of the present invention.

As shown in FIG. 5, flowchart 500 includes: receive data set operation S502; apply autoencoder to get the feature representatives operation S504; cluster the data records based on the feature representatives operation S506; draw K samples based on original feature with cluster labels as a stratified variable operation S508; build autoencoder model in each data sample operation S510; aggregate the autoencoder models operation S512; and output the reduced features S514. As shown, FIG. 6 includes original data table 600. As shown in FIG. 7, graph 700 includes: autoencoder 702; input 704; encoder nodes 706, feature representative nodes 708; decoder nodes 710; output 712; and unidirectional connections 714 (typical). As shown, FIG. 8 includes feature representative data set table 800. As shown, FIG. 9 includes cluster results table 900. As shown in FIG. 10, diagram 1000 includes: original data table (with cluster label column) 1002; data sample 1 table 1004; data sample 2 table 1006; and data sample K table 1008. As shown in FIG. 11, diagram 1100 includes: original data table (with cluster label column) 1002; data sample 1 table 1004; data sample 2 table 1006; data sample K table 1008; autoencoder model 1 1102; autoencoder model 2 1104; and autoencoder model 3 1106. As shown in FIG. 12, diagram 1200 includes: original data table (with cluster label column) 1002; data sample 1 table 1004; data sample 2 table 1006; data sample K table 1008; autoencoder model 1 1102; autoencoder model 2 1104; autoencoder model 3 1106; and aggregated autoencoder model 1202. As shown in FIG. 13, diagram 1300 includes: original data table 600; aggregated autoencoder model 1202; and output data table 1302.

The method of flowchart 500 of FIG. 5 includes seven (7) operations which will be respectively discussed in the following seven (7) paragraphs, with reference to the various diagrams of FIGS. 6 to 13.

Operation 1: Receive data set. In this embodiment of the present invention, operation S502 receives data from an original data set. Table 600 of FIG. 6 shows an example of this original data set which has "n" features, X1, X2, . . . , Xn and N records. In one embodiment of the present invention, what is needed is to reduce the number of "n" features to new "m" features which will be described in the following operations below.

Operation 2: Apply autoencoder to get the feature representatives. In this embodiment, operation S504 uses an autoencoder neural network to reduce the size of features into a smaller representative. Graph 700 within FIG. 7 shows a simple example of an autoencoder neural network, 702. The input values $x_1 \ldots, x_n$ are values of one record in the original data set (table 600 of FIG. 6). The encoder layer encodes the input values into m(m<n) values $f_1 \ldots, f_m$ which are values of "m" feature representatives F1, F2, . . . , Fm, respectively. The input is provided using unidirectional connections 714 in FIG. 7. The representative values are then decoded by the decoder layer to another set of "n" output values $\hat{x}_1 \ldots, \hat{x}_n$ which are the prediction of $x_1, \ldots, x_n$, respectively. After the autoencoder operation has been performed, the original data can be reduced to "m" feature representatives. As further shown in FIG. 7, unidirectional connections 714 are used to send information between all aspects of the autoencoder including the input 704, encoder 706, feature representative 708, decoder 710, and output operation 712. In addition, an example of "m" feature representatives' data set is shown in table 800 of FIG. 8.

Operation 3: Cluster the data records based on the feature representatives. In this embodiment, operation S506 segments the data records of the feature representative data set into a number of clusters using existing clustering techniques (for example, K-mean). A variable cluster label is then created, where each record will have a cluster label. Table 900 of FIG. 9 is an example of the cluster results, where the data records are grouped into two (2) clusters. Further, by comparing tables 800 and 900, table 900 shows the addition of cluster-1 and cluster-2 cells under the cluster label column.

Operation 4: Draw K samples based on original feature with cluster labels as a stratified variable. In this embodiment, operation S508 creates K data samples using a stratified sampling method with the cluster label as the stratified variable. The results from the original data create: (i) data sample 1, item 1004; (ii) data sample 2, item 1006; and (iii) data sample K, item 1008, as shown in diagram 1000 of FIG. 10.

Operation 5: Build autoencoder model in each data sample. In this embodiment, operation S510 builds an autoencoder model on each sample. The results from this operation are shown as: (i) autoencoder model 1, item 1102; (ii) autoencoder model 2, item 1104; and (iii) autoencoder model K, item 1106, in diagram 1100 of FIG. 11.

Operation 6: Aggregate the autoencoder models. In this embodiment, operation S512 aggregates the autoencoder models. An example of the aggregation of autoencoder is the average of the weights for autoencoder models 1102, 1104, 1106 to get the final aggregated autoencoder model 1202. This is shown in diagram 1200 of FIG. 12.

Operation 7: Output the reduced features. In this embodiment, operation S514 outputs the reduced features. As shown in diagram 1300 of FIG. 13, original data set item 600 sends input to the aggregated model 1202 for processing. Within aggregated model 1202, feature representative items $f_1, f_2, \ldots, f_m$ perform the operations. The result of the processing generates output table 1302.

Some embodiments of the present invention may include one, or more, of the following operations, features, characteristics and/or advantages: (i) provides user a method of dimension reduction based on unsupervised learning; (ii) the incorporation of autoencoder captures both linear and non-linear relationships; (iii) uses stratified sampling that weakens the impact of anomalies; and/or (iv) aggregation of multiple autoencoder estimates leads to stable results.

Some embodiments of the present invention may include one, or more, of the following operations, features, characteristics and/or advantages: (i) avoids negative impact of anomalies to models; (ii) works with non-linear relationships; (iii) works with categorical features; (iv) applies stratified sampling to weaken the impact of anomalies without any pre-estimation; and/or (v) can be adopted by existing related applications that would improve their services and distinguish them from opensource products.

Some embodiments of the present invention may include one, or more, of the following operations, features, characteristics and/or advantages with regard to discoverability: (i) is easy to detect; (ii) is easy to check the user manual and/or available program results; (iii); examining source code would not be needed; and/or (iv) reverse engineering would not be needed.

Some embodiments of the present invention may include one, or more, of the following operations, features, characteristics and/or advantages: (i) creating final reduced training data by removing dimension values from the TDRs of the unreduced training data which do not correspond to any of the L dimensions identified using the final autoencoder; (ii) performing training in a machine learning computer system using the final reduced training data; and/or (iii) using the average of weights between two nodes as a final weight of two corresponding nodes in the final autoencoder.

V. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Dimension value: may take the form of a single numerical value, a single non-numerical value, a range of numerical and/or non-numerical values and/or multiple discrete numerical and/or non-numerical values.

What is claimed is:

1. A computer-implemented method, comprising:
receiving a plurality of unreduced training data records (TDRs), wherein each unreduced TDR includes at least M dimension values with each M dimension value respectively corresponding to one of M number of dimensions characterizing each unreduced TDR;
executing a first autoencoder on the plurality of unreduced TDRs, wherein the executing feeds the plurality of unreduced TDRs through an encoder layer of the first autoencoder that encodes the plurality of unreduced TDRs into a feature representatives hidden layer, wherein the feature representatives hidden layer learns a lower-dimensional representation of the plurality of unreduced TDRs, wherein the lower-dimensional representation of the plurality of unreduced TDRs includes a first plurality of reduced TDRs, wherein each first reduced TDR includes at least N dimension values, with each N dimension value respectively corresponding to one of N number of dimensions characterizing each first reduced TDR, wherein the N number of dimensions is less than the M number of dimensions;

clustering the first plurality of reduced TDRs into a plurality of clusters based on the at least N dimension values learned by the feature representatives hidden layer, wherein each first reduced TDR cluster of the plurality of clusters is assigned a respective cluster label;

transferring the respective cluster label from each first reduced TDR cluster to a corresponding unreduced TDR cluster such that the plurality of unreduced TDRs include a plurality of unreduced TDR clusters having a plurality of respective cluster labels;

performing stratified sampling from the plurality of unreduced TDR clusters to generate K data blocks of unreduced TDRs using the plurality of respective cluster labels as respective stratified variables; and executing a final autoencoder comprising an aggregation of a plurality of autoencoder models on the K data blocks of unreduced TDRs, wherein a respective autoencoder model of the plurality of autoencoder models is constructed in each data block of the K data blocks of unreduced TDRs.

2. The computer-implemented method of claim 1, further comprising:

using the final autoencoder on the plurality of unreduced TDRs to obtain an identification of L number of dimensions from among the M number of dimensions characterizing each unreduced TDR, wherein the L number of dimensions is less than the M number of dimensions and wherein the L number of dimensions is less than the N number of dimensions.

3. The computer-implemented method of claim 2, further comprising:

creating a plurality of final reduced TDRs by combining and/or removing dimension values from each unreduced TDR which do not correspond to any of the L number of dimensions identified using the final autoencoder; and performing training in a machine learning computer system using the plurality of final reduced TDRs.

4. The computer-implemented method of claim 1, wherein the aggregation of the plurality of autoencoder models includes using an average of weights between two nodes as a final weight between two corresponding nodes in the final autoencoder.

5. A computer program product for dimension reduction, comprising:

one or more computer readable storage media and program instructions collectively stored on the one or more computer readable storage media, the program instructions executable by a processor to cause the processor to perform a method comprising:

receiving a plurality of unreduced training data records (TDRs), wherein each unreduced TDR includes at least M dimension values with each M dimension value respectively corresponding to one of M number of dimensions characterizing each unreduced TDR;

executing a first autoencoder on the plurality of unreduced TDRs, wherein the executing feeds the plurality of unreduced TDRs through an encoder layer of the first autoencoder that encodes the plurality of unreduced TDRs into a feature representatives hidden layer, wherein the feature representatives hidden layer learns a lower-dimensional representation of the plurality of unreduced TDRs, wherein the lower-dimensional representation of the plurality of unreduced TDRs includes a first plurality of reduced TDRs, wherein each first reduced TDR includes at least N dimension values, with each N dimension value respectively corresponding to one of N number of dimensions characterizing each first reduced TDR, wherein the N number of dimensions is less than the M number of dimensions;

clustering the first plurality of reduced TDRs into a plurality of clusters based on the at least N dimension values learned by the feature representatives hidden layer, wherein each first reduced TDR cluster of the plurality of clusters is assigned a respective cluster label;

transferring the respective cluster label from each first reduced TDR cluster to a corresponding unreduced TDR cluster such that the plurality of unreduced TDRs include a plurality of unreduced TDR clusters having a plurality of respective cluster labels;

performing stratified sampling from the plurality of unreduced TDR clusters to generate K data blocks of unreduced TDRs using the plurality of respective cluster labels as respective stratified variables; and executing a final autoencoder comprising an aggregation of a plurality of autoencoder models on the K data blocks of unreduced TDRs, wherein a respective autoencoder model of the plurality of autoencoder models is constructed in each data block of the K data blocks of unreduced TDRs.

6. The computer program product of claim 5, wherein the program instructions further cause the processor to perform:

using the final autoencoder on the plurality of unreduced TDRs to obtain an identification of L number of dimensions from among the M number of dimensions characterizing each unreduced TDR, wherein the L number of dimensions is less than the M number of dimensions and wherein the L number of dimensions is less than the N number of dimensions.

7. The computer program product of claim 6, wherein the program instructions further cause the processor to perform:

creating a plurality of final reduced TDRs by combining and/or removing dimension values from each unreduced TDR which do not correspond to any of the L number of dimensions identified using the final autoencoder; and performing training in a machine learning computer system using the plurality of final reduced TDRs.

8. The computer program product of claim 5, wherein the aggregation of the plurality of autoencoder models includes using an average of weights between two nodes as a final weight between two corresponding nodes in the final autoencoder.

9. A computer system for dimension reduction, comprising:

one or more processors, one or more computer readable memories, one or more computer readable tangible storage media, and program instructions stored on at least one of the one or more computer readable tangible storage media for execution by at least one of the one or more processors via at least one of the one or more computer readable memories, wherein the computer system is capable of performing a method comprising:

receiving a plurality of unreduced training data records (TDRs), wherein each unreduced TDR includes at least M dimension values with each M dimension value respectively corresponding to one of M number of dimensions characterizing each unreduced TDR;

executing a first autoencoder on the plurality of unreduced TDRs, wherein the executing feeds the plurality of unreduced TDRs through an encoder layer of the first autoencoder that encodes the plurality of unreduced TDRs into a feature representatives hidden layer, wherein the feature representatives hidden layer learns a lower-dimensional representation of the plurality of unreduced TDRs, wherein the lower-dimensional representation of the plurality of unreduced TDRs includes a first plurality of reduced TDRs, wherein each first reduced TDR includes at least N dimension values, with each N dimension value respectively corresponding to one of N number of dimensions characterizing each first reduced TDR, wherein the N number of dimensions is less than the M number of dimensions;

clustering the first plurality of reduced TDRs into a plurality of clusters based on the at least N dimension values learned by the feature representatives hidden layer, wherein each first reduced TDR cluster of the plurality of clusters is assigned a respective cluster label;

transferring the respective cluster label from each first reduced TDR cluster to a corresponding unreduced TDR cluster such that the plurality of unreduced TDRs include a plurality of unreduced TDR clusters having a plurality of respective cluster labels;

performing stratified sampling from the plurality of unreduced TDR clusters to generate K data blocks of unreduced TDRs using the plurality of respective cluster labels as respective stratified variables; and executing a final autoencoder comprising an aggregation of a plurality of autoencoder models on the K data blocks of unreduced TDRs, wherein a respective autoencoder model of the plurality of autoencoder models is constructed in each data block of the K data blocks of unreduced TDRs.

10. The computer system of claim 9, wherein the computer system is further capable of performing:

using the final autoencoder on the plurality of unreduced TDRs to obtain an identification of L number of dimensions from among the M number of dimensions characterizing each unreduced TDR, wherein the L number of dimensions is less than the M number of dimensions and wherein the L number of dimensions is less than the N number of dimensions.

11. The computer system of claim 10, wherein the computer system is further capable of performing:

creating a plurality of final reduced TDRs by combining and/or removing dimension values from each unreduced TDR which do not correspond to any of the L number of dimensions identified using the final autoencoder; and performing training using the plurality of final reduced TDRs.

12. The computer system of claim 9, wherein the aggregation of the plurality of autoencoder models includes using an average of weights between two nodes as a final weight between two corresponding nodes in the final autoencoder.

* * * * *